UNITED STATES PATENT OFFICE.

FRANK H. COYNE, OF BRYN MAWR, PENNSYLVANIA, ASSIGNOR TO THE GENERAL FIBER COMPANY, OF CLEVELAND, OHIO, A CORPORATION OF OHIO.

PAPER.

1,168,285. Specification of Letters Patent. Patented Jan. 18, 1916.

No Drawing. Application filed January 4, 1915. Serial No. 506.

*To all whom it may concern:*

Be it known that I, FRANK H. COYNE, a citizen of the United States, resident of Bryn Mawr, county of Montgomery and State of Pennsylvania, have invented a new and useful Improvement in Paper, of which the following is a specification, the principle of the invention being herein explained and the best mode in which I have contemplated applying that principle, so as to distinguish it from other inventions.

My invention relates to paper, that is a material consisting of a compacted felt of fiber.

The particular paper which is the subject-matter of the present invention, is made from the straw of flax which has been grown for seed. Distinction is made between flax grown for fiber and flax grown for seed. The flax grown for fiber, aside from being somewhat different in natural character, is harvested before maturity. The flax grown for the production of seed, as it is grown in the northwestern States of this country, is harvested after the plant is practically mature. The straw is threshed and the seed, or most of it, thereby removed. The seed is, in this instance, the principal product sought.

The straw, which contains all the bark, bast, as well as the brittle central tube of the plant, is largely waste. The straw is in such a tangled mass that the fibers of the bast cannot be removed by any known process in any way suitable for textile or cordage use. I have discovered that by chopping this straw to short lengths of an inch or more, and passing these through a beater, I get a pulp which I may make into a paper having certain very desirable qualities. The paper which I produce after this fashion, is composed of the cortex or bark, the bast cells, and the pithy and other cells of the plant. There is in the straw only a very small percentage of water-soluble material, so that a ton of straw will produce within a very few pounds, a ton of paper. The paper is produced without the addition of any sizing or bleaching agents, and is suitable for various purposes; and on account of a peculiar quality which I shall detail below, is especially suitable for the manufacture of roofing paper.

The pieces of cortex scattered throughout the mass of the paper afford, if the paper is used as wall paper, certain spots of light, or points of brighter reflection, whereby the paper is given a spotted or oatmeal effect. These pieces of cortex or bark are, however, found throughout the mass of paper, and they are of peculiar advantage when it comes to saturating the paper with a waterproofing agent, as in the matter of roofing paper. These little pieces of brighter colored bark afford, in the cavities which they make in the paper, numerous places where the tar or other matter may be anchored, as it were, each anchorage surrounding to a more or less great extent a particle of the bark. That is, each of the cavities occupied by one of these little pieces of bark may be imagined to be filled after saturation with a bag or vesicle of the saturating agent having in the center of said vesicle a piece of the bark. This, of course, is more or less of an ideal condition, as sometimes several pieces of the bark may be united in one or they may be not completely surrounded.

Of course the adhesion between the tar or other saturating agent and the bark, particularly the underside thereof, is practically complete, so that these particles are bound very firmly together, and being comparatively coarser than the other fibers in the paper serve to keep the absorbed material in position and without running, even when the paper is charged to complete saturation, and even when it may be said to be supersaturated. That is, paper of the structure which I have detailed above, is capable of absorbing and holding a very high proporation of the roofing cement or tar, without permitting the latter to run or flow when exposed to a hot sun. Moreover, the fibers of flax are very resistant in themselves to other influences, being composed of practically pure cellulose in the mature plant, so that the durability of paper made from the entire straw of the mature flax after the manner I have indicated, when used for roofing purposes, is very large.

Having thus described my invention, what I claim and desire to secure by Letters Patent is:

1. As a new article of manufacture, a sheet of paper made directly from mature flax straw, said paper having throughout its structure numerous bits of the cortex of the flax plant so as to form anchorages for roofing compounds.

2. As a new article of manufacture, a paper made directly and wholly from the whole of the flax plant, the plant having been passed through a beater until the fibers have become changed into paper making material but with the cortex remaining largely in small pieces unreduced, whereby the finished product consists of a felted mass of the fibers and pith of the flax plant having embedded therein unreduced particles of the cortex.

Signed by me this first day of January, 1915.

FRANK H. COYNE.

Attested by—
VICTOR E. MUELLER,
A. E. MERKEL.